(12) United States Patent
Hardy

(10) Patent No.: US 6,370,120 B1
(45) Date of Patent: Apr. 9, 2002

(54) METHOD AND SYSTEM FOR EVALUATING THE QUALITY OF PACKET-SWITCHED VOICE SIGNALS

(75) Inventor: William Christopher Hardy, Dallas, TX (US)

(73) Assignee: MCI WorldCom, Inc., Washington, DC (US)

( * ) Notice: Subject to any disclaimer, the term of this patent is extended or adjusted under 35 U.S.C. 154(b) by 0 days.

(21) Appl. No.: 09/220,733

(22) Filed: Dec. 24, 1998

(51) Int. Cl.[7] .................................................. H04L 12/26
(52) U.S. Cl. ........................ 370/252; 370/235; 370/352
(58) Field of Search .................................. 370/252, 232, 370/233, 234, 352, 356, 357, 358, 242, 244, 245, 250, 253; 704/228, 270.1, 200, 233, 234; 709/223, 224, 225, 226

(56) References Cited

U.S. PATENT DOCUMENTS

| | | | | |
|---|---|---|---|---|
| 5,119,367 A | * | 6/1992 | Kawakatsu et al. ......... | 370/235 |
| 5,200,950 A | * | 4/1993 | Foglar et al. ............... | 370/219 |
| 5,553,059 A | | 9/1996 | Emerson et al. | |
| 5,825,849 A | | 10/1998 | Garland et al. | |
| 6,041,048 A | * | 3/2000 | Erickson et al. ............ | 370/349 |
| 6,046,979 A | * | 4/2000 | Bauman ..................... | 370/229 |
| 6,067,350 A | * | 5/2000 | Gordon ...................... | 370/352 |
| 6,111,949 A | | 8/2000 | Sheets et al. | |
| 6,128,291 A | * | 10/2000 | Perlman et al. ............. | 370/352 |
| 6,147,988 A | * | 11/2000 | Bartholmew et al. ....... | 370/352 |
| 6,243,373 B1 | * | 6/2001 | Turcok ....................... | 370/352 |
| 6,275,797 B1 | * | 8/2001 | Randic ....................... | 704/233 |
| 6,282,192 B1 | * | 8/2001 | Murphy et al. ............. | 370/352 |

* cited by examiner

Primary Examiner—Ricky Ngo
Assistant Examiner—Phuc Tran

(57) ABSTRACT

Method and apparatus for evaluating the quality of a packet-switched voice connection. The apparatus includes measurement circuitry coupled to receive a voice signal. The measurement circuitry measures rate of packet loss and at least one other objective characteristic of the voice signal. The rate of packet loss and the at least one other objective characteristic are related to a plurality of quality characteristics affecting the quality of the voice signal as perceived by users, such that measurements of the rate of packet loss and the at least one other objective characteristic can be translated into subjective quantifications of each of the quality characteristics. A database stores an effects matrix. The effects matrix provides quality information for voice signals that include different combinations of subjective quantifications for each quality characteristic. Software operating on the apparatus utilizes measurements of the rate of packet loss and the at least one other objective characteristic and the effects matrix to generate quality information for the voice signal.

28 Claims, 5 Drawing Sheets

METHOD AND SYSTEM FOR EVALUATING THE QUALITY OF PACKET-SWITCHED VOICE SIGNALS

CROSS-REFERENCE TO RELATED APPLICATIONS

The following copending commonly assigned U.S. patent applications are hereby incorporated herein by reference:

| U.S. Pat. or Ser. No. | Filing Date | Attorney Docket No. |
|---|---|---|
| 08/751,023 | November 18, 1996 | VON-96-001 |
| 08/798,350 | February 10, 1997 | VON-97-004 |

FIELD OF THE INVENTION

This invention relates generally to telecommunications and specifically to a method and system for evaluating the quality of packet-switched voice signals.

BACKGROUND OF THE INVENTION

Telephone connections have always been subject to impairments in the form of noise, attenuation, distortion, crosstalk, and echo. Such impairments are particularly common to analog portions of the connection, such as along subscriber loops and within frequency domain multiplexing equipment. Digital transmission alleviates many of these problems but introduces quantization noise or glitches. Even with perfect digital transmission applied for long-haul connections, a typical telephone connection includes many analog components, such as hybrids, where impairments can occur.

A poor connection or a malfunctioning piece of equipment can produce conditions that a telephone customer will find objectionable or intolerable, so that the connection is deemed to be of very poor quality. When there is a high incidence of such poor connections, customers may complain to the service provider or regulatory authorities, or simply change long distance carriers. Perceived quality of telephone connections is therefore a major factor affecting the reputation and marketability of long distance telephone services.

To guard against poor quality, telephone service providers have developed methods to take objective quality measurements upon a line, a piece of equipment, or even an end-to-end telephone connection. These measurements can help the service provider detect and gauge impairments, pinpoint weak elements and correct deficiencies that degrade user perception of quality.

Many such objective measurements are well known and standardized in the art. Empirically-derived thresholds enable analysts to infer the existence and severity of quality problems by comparing measurements to tables of acceptable value. For example, power levels of test signals and quiet channel noise can be measured electronically. Since it is well known that a certain range of signal levels must reach a telephone receiver to produce acceptable volume at the earpiece, and C-weighted noise must be kept at a level relative to the signal level to keep users from experiencing unacceptable noise at the earpiece, the combination of measures for a particular connection supports accurate assessment of the likelihood that a user would find that connection to be of poor quality with respect to ability to hear the distant talker.

For such objective measurements, the effect of extreme values on user perception of quality is clear, and there are easily discerned thresholds for "no effect" and "substantial degradation" conditions. However, for immediate values, there is generally no clear division between values representing acceptable and unacceptable connection quality. Speech clarity and perceived connection quality depend on many variables, including, for example, speech content, talker rhythms, subjective perception of the listener, and users' acclimation to their telephone service. As a result, the correlations between values of objective measures and user perception of connection quality are statistical, representing the combined effects of many different kinds of impairments and variations of sensitivity to them among the population.

Earlier work by the inventor and others in this area have created mappings between objective measurements and perceived quality, so that, for example, when a given circuit was measured in terms of signal level, noise, distortion, crosstalk, and echo, the mapping predicts the percentage of conversations that would be reported as being significantly impaired or of poor quality as perceived by an average user population. Such mappings have proven to be a powerful tool for analyzing reported impairments and for gauging acceptable performance of a new line or piece of equipment before deployment.

The mapping was produced by creating or finding various combinations of measurable characteristics along telephone circuits and then having a population of callers conduct test calls to subjectively gauge the quality of each call. For each test call, the circuit under analysis was rated on a scale of None-Some-Much for each of the impairments manifested to users of the connection related to the selected objectively measurable characteristics. These impairments include noise, volume, distortion, and echo. Each caller also provided an opinion score, which is an overall rating of the circuit quality on a numerical scale.

Each caller also determined whether the overall effect of the impairments was to render the connection: unusable (U; rendering the channel entirely unusable), difficult (D; causing enough difficulty to require adaptation by the speaker and listener), irritating (I; disturbing but not requiring adaptation by the speaker and listener), noticeable (N; minor enough to be ignored), or unnoticeable (O; no effect on quality). The percentage of calls or connections that elicit any one of the first three responses (unusable, difficult, or irritating) is called the P(UDI). The P(UDI) is of particular interest to service providers as a meter of customer satisfaction because it has been shown that overall satisfaction decreases as P(UDI) increases, regardless of average opinion score.

Analysis of empirical data including user reports of impairments and perception quality, together with user reports of impairments obtained in conjunction with objective measurements of connection characteristics then supported a two step development of a means for predicting user perception of quality from objective measurements. First, a model supporting prediction of P(UDI) and average opinion score as a function of percentages of calls with each of the possible combinations of "none," "some," and "much" (N, S, M) conditions reported for each of the impairments considered was produced. Then, objective measurements were correlated with user reports of impairments to predict the proportion of N, S, M reports from users that will eventuate as a function of objective measurements. From these two elements, it was then possible to take measurements of the objective characteristics for connections and translate the set of measures obtained into estimates of likely user perception of quality as revealed by P(UDI) and the average opinion score.

SUMMARY

In one aspect, the present invention provides a technique for assessing the quality of a packet-switched communications channel. For instance, the technique provides a means by which a set of objective measurements for a packet-switched telephony connection can be processed to derive a projected perceptual quality level for the connection. It extends upon the techniques of the prior art to adapt for the effects of important new technologies.

Specifically, the present invention addresses packet-switched (e.g., Internet Protocol based) telephony, which is subject to a different set of impairments from ordinary link-switched telephony. The packet-switched environment can produce momentary interruptions or latencies in a streaming signal. In addition, some speech compression and coding schemes can suffer dropouts or garbled portions depending upon the loss of certain packets. Such impairments represent new phenomena that must be incorporated into the measures-to-impairments and impairments-to-quality transforms used to predict user perception of quality.

In one embodiment, the present invention provides a method of evaluating the quality of a packet-switched voice signal. To begin, a plurality of objective characteristics for a voice signal being transmitted across a packet-switched network are selected. At least one of these objective characteristics is packet loss. For each of the objective characteristics, correlations are determined in order to categorize quantitative measurements of the objective characteristic into a number of categories, representing a subjective assessment of the presence and severity of impairments as perceived and described by users. To do so, a plurality of evaluation voice messages is generated by varying selected ones of the plurality of objective characteristics for each of the evaluation voice messages. The quality of each of the evaluation voice messages is then empirically measured by having a test subject (or subjects) listen to the evaluation voice messages and grade each voice message with respect to the selected impairments. The probability that a packet-switched voice signal will achieve a particular rating is then determined, by suitably amending extant effects models, which correlate subjective assessments of presence and severity of impairments with subjective measures of overall connection quality. The determination thus utilizes a measurement of objectively quantifiable characteristics of the packet-switched voice signal to predict the subjective user quality rating of the packet-switched voice signal.

In one embodiment, the objective characteristics are correlated with corresponding user perception of the severity of the manifestation of that characteristic as an impairment to conversation. For example, if a packetized voice signal is missing some packets, a listener may perceive speech distortion. In this case, the objective characteristic is packet loss and the manifestation of that characteristic to the user is speech distortion.

The techniques of the present invention allow objective measurements to replace subjective measurements upon a channel. This yields an improvement, for example, in gauging performance of a channel or a communications element before it is put into service. The objective assessment of an Internet telephony channel is expressed in a way that is relevant to perceived quality.

The present invention can be used in a variety of contexts. For example, a phone system or a portion of a phone system (e.g., a line or a piece of equipment) can be tested before being used commercially. In another application, a workstation stores and analyzes objective measurements. This workstation can be used by an engineer troubleshooting a network or a sales engineer comparing qualities of various options. The present invention could also be used in an automatic, real-time control system for a communications network.

DETAILED DESCRIPTION

The making and use of the various embodiments are discussed below in detail. However, it should be appreciated that the present invention provides many applicable inventive concepts that can be embodied in a wide variety of specific contexts. The specific embodiments discussed are merely illustrative of specific ways to make and use the invention and do not limit the scope of the invention.

In a first aspect, the present invention allows for a correlation between objective measurements and perceived quality in the context of a packet-switched communications channel.

Figure 1A:
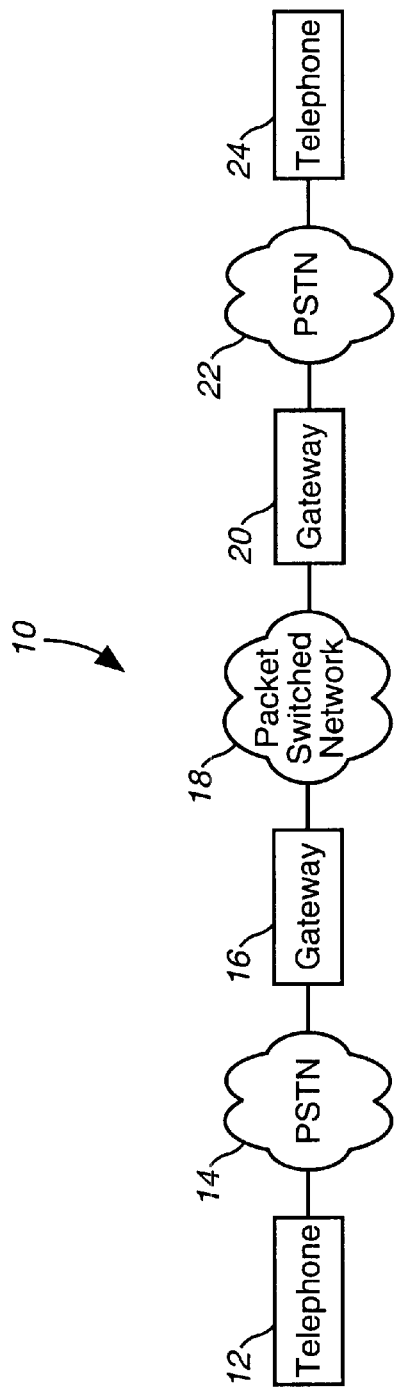
FIGS. 1a and 1b are examples of two communications networks that can utilize the present invention.
Figure 1B:
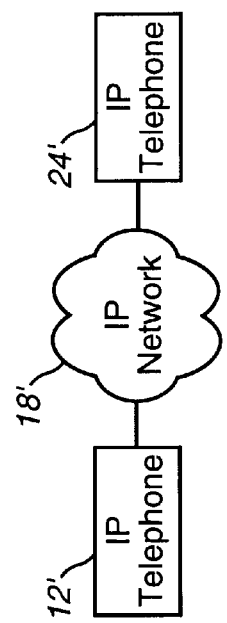

FIGS. 1a and 1b illustrate simplified block diagrams of two examples of networks that can utilize the present invention. Referring first to FIG. 1a, a hybrid telephone network 10 includes both circuit switched network portions 14 and 22 and a packet-switched network portion 18. To utilize the hybrid telephony network 10, an initiating telephone 12 initiates a call with the circuit switched network 14. In the preferred embodiment, the initiating telephone 12 is an ordinary telephone and the circuit switched network 14 is the public switched telephone network (PSTN). The present invention, however, is equally applicable to use with proprietary equipment and private networks.

Circuit switched network 14 routes the call to a gateway 16, sometimes referred to as an internet telephony gateway (ITG). Gateway 16 converts the circuit switched telephone signals into packets that are compatible with the packet-switched network 18. While many protocols can be utilized, most current networks carrying packet-switched voice use Internet Protocol (IP). Gateway 16 will also have access to a directory (not shown) of addresses (e.g. IP addresses for an IP-based network). Utilizing this directory, gateway 16 addresses the packets to an appropriate exit gateway 20.

The voice signals are then transported through packet-switched network 18 from gateway 16 to gateway 20. Packet-switched network 18, sometimes referred to as a converged network, combines various types of media, such as voice calls, data, and streams of video, onto a single line. All these different media are chopped into discrete blocks of data or packets. As mentioned above, packet-switched network 18 can be an IP-based network.

One example of an IP-based network is the public Internet. In this context, the "Internet" (uppercase "I") or public Internet is used to connote the worldwide collection of interconnected networks that uses Internet Protocol (IP) to link a large number of physical networks into a single logical network. Physically, the Internet is a huge, global network spanning nearly 100 countries and comprising a great number of academic, commercial, government, and military networks.

Packet-switched network 18 could also comprise other IP-based networks as well as other communication networks. For example, packet-switched network 18 could comprise an internet which is not connected to the public Internet. In this context, an "internet" (lowercase "i") is any collection of separate physical networks, interconnected by a common protocol, to form a single logical network. An internet would preferably, but not necessarily use Internet Protocol. An internet which is owned by a single entity is sometimes referred to as an intranet or virtual private network. Network 18 can comprise an intranet, which is or is not connected to the Internet.

For final delivery, gateway 20 converts the packets back into a format that is compatible with circuit switched network 22. As before, in the preferred embodiment circuit switched network 22 is the PSTN. In other words, circuit switched network 14 and circuit switched network 22 may be two portions of the same network, for example in two different parts of the country or the world. The telephone call can then be routed to receiving telephone 24.

The telecommunications network of FIG. 1b is similar to that of FIG. 1a except that it is an end-to-end packet-switched network. In this case, the initiating telephone 12' can generate packet-switched signals and provide these directly to packet-switched network 18'. In this embodiment, the packets can be generated either by telephone 'or by equipment (not shown) that is relatively close to telephone 12' (for example, in the same building). The call is routed across packet-switched network 18' to receiving phone 24'.

Further details on hybrid and end-to-end packet-switched networks are provided in commonly assigned patent applications Ser. No. 08/751,023 filed Nov. 18, 1996 (Attorney Docket No. VON-96-001) and Ser. No. 08/798,350 filed Feb. 10, 1997 (Assignee Docket No. VON-97-004), each of which is incorporated herein by reference.

Figure 2:
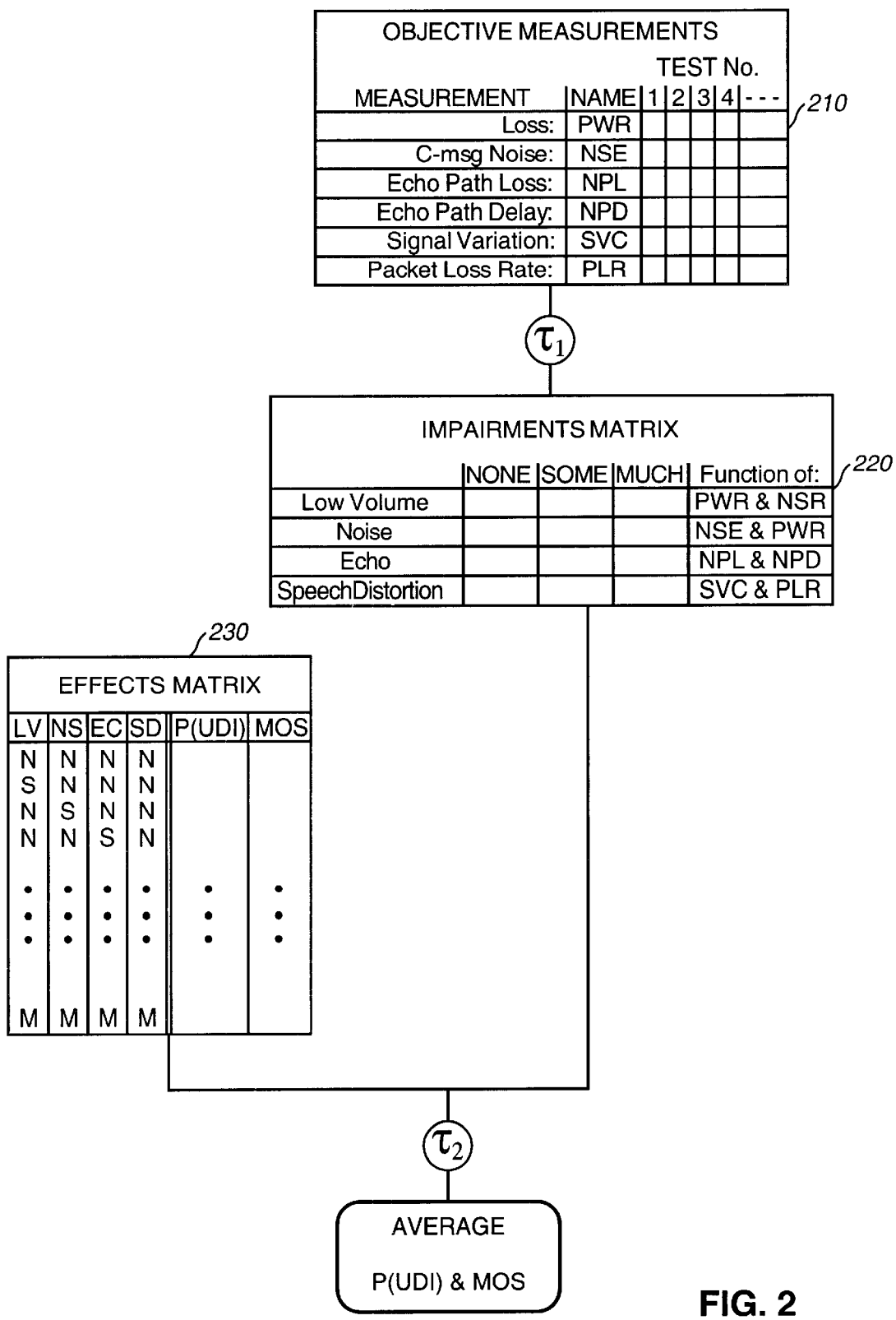
FIG. 2 is a diagram of a process that converts objective measurements into estimates of user perception of quality for packet-switched telephony.

In one aspect, the present invention relates to a method for evaluating the quality of a packet-switched voice signal (or connection). A preferred embodiment flow diagram of one such method is illustrated in FIG. 2. The voice signal can be transmitted along the network 10 illustrated in FIGS. 1a or 1b or along portions thereof. For example, a telephony service provider may wish to test a new piece of equipment or a new trunk prior to placing it on the network.

To begin, objective characteristics of the packet-switched voice signal under test are selected. These objective characteristics are measurable and can be used to characterize the signal. Objective characteristics include signal loss, noise, waveform distortion, packet loss, echo path delay, and echo path loss as illustrated by test matrix 210. Some of the attributes that are measured may be common with those measured for satellite or terrestrial networks. If this is the case, data derived from measurements and studies of these networks can be used along with the measurements and studies performed on a packet-switched network.

Some of the objective characteristics are unique to packet-switched systems. For example, packet loss is a measurable attribute of a packet-switched voice signal. As it turns out, in performing experiments in work leading to the present invention, the inventor has discovered that packet loss tends to be an important objective characteristic for many packet-switched telephony systems.

Each of the objective characteristics will lead to a manifestation in the perceived quality of the voice signal. Table 1 provides a listing of the manifestations corresponding to selected measurable characteristics. Other characteristics could also or alternatively be utilized.

TABLE 1

| Objective Characteristic | Manifestation |
| --- | --- |
| Loss (or level) | Low volume |
| Noise | Noisiness |
| Waveform distortion | Speech distortion |
| Packet loss | Speech distortion |
| Echo path delay | Echo |
| Echo path loss | Echo |

The level for each objective characteristic is transformed into an expected percentage of the population that would categorize the manifestation into one of a number of subjective quantifications. Different manifestations (or quality characteristics) can have different numbers of subjective quantifications. For example, in the preferred embodiment three subjective quantification categories—none, some and much—are defined for each quality characteristic. Test subjects are then instructed to rate the presence of an impairment as "none" if it is absent, "much" if it is present and very noticeable, and "some" otherwise.

Subjective evaluators are used to determine the correlation between objective measurements and none-some-much ratings. Typically a large number of subjective evaluators (e.g., 44 people or more) are used to evaluate the system. These subjective evaluators listen to test messages and rate the effect of the objective characteristic on the manifestation. For example, the evaluator will listen to a test signal or series of test signals with varying signal noise (an objective characteristic) and then describe the signal as having "none", "some" or "much" noisiness (a quality characteristic). The same tests are performed for the other objective characteristics to determine the perceived effect on the voice signal. These tests can be performed by varying one characteristic at a time or by varying more than one objective characteristic. The evaluator may (or may not) also be asked to evaluate the effect on the voice signal and the overall quality of the message.

Evaluation voice messages are generated by varying selected ones of the objective characteristics. For example, a first evaluation message may have 35 dBrnc noise, −25 dB loss, packet loss at a rate of one packet per minute, echo path loss of −25 dB, and an echo path delay of 20 msec. Other evaluation messages would have a different variation of these characteristics. Messages within the same classes can be duplicated with different voice content. In this manner a set of evaluation messages is generated.

These other evaluation messages are designed to represent variations with respect to each objective characteristic over the range between values which represent levels of which nearly one hundred percent in a population would report the associated impairments as "none" and "much".

The evaluation voice messages can be generated prior to empirical testing or can be real-time telephone conversations. Prior generated messages are useful because parameters can be precisely varied in the laboratory before hand and the content can be held constant. Real-time conversations are useful because parties on either end can evaluate the call.

The data collected from the evaluation messages then provide a basis for estimating the percentage of "none", "some", and "much" responses as a function of the values of the objective measurements, thereby supporting development of the $\tau_1$, transform in FIG. 2. The $\tau_1$ transform is used to translate measurement of each of the objective characteristics into subjective quantifications of each of the quality characteristics. For example, FIG. 2 illustrates how the measurements of objective characteristics such as loss (PWR), noise (NSE), echo path delay (EPD), echo path loss (EPL), and packet loss rate (PLR) can be used to determine subjective quantifications (e.g., none, some, much) of quality characteristics such as low volume, noise, echo and speech distortion.

The overall quality of the evaluation messages can be empirically measured. In the preferred embodiment, a large number of evaluation messages are played to a number of test subjects who subjectively evaluate and rate the quality of each. For example, the test subjects use a scale of one to five to rate each message. The ratings could be unusable (U; rendering the channel entirely unusable), difficult (D; causing enough difficulty to require adaptation by the speaker and listener), irritating (I; disturbing but not requiring adaptation by the speaker and listener), noticeable (N; minor enough to be ignored), or unnoticeable (O; no effect on quality). Alternatively, voice quality can be graded on a scale of bad (B), poor (P), fair (F), good (G), and excellent (E).

As further objective measurements upon the packet-switched channel, the frequency and duration of dropouts due to lost or severely delayed packets are measured and summarized statistically. Averaged dropout occurrence is then used to calculate the probability that speech will be perceived as being distorted by sudden changes in speech waveforms or occurrence of incomplete words, when signal loss spans the duration of one syllable or more.

The empirical data is captured and summarized to map the combined effects of objective characteristics such as noise, signal level, distortion, and echo into a perceived quality level. Because this mapping is independent of the underlying transport, figures taken from, for example, common analog telephony may be applied here as well. However, if the circuit under test differs substantially from the circuit used to generate the data, then a new characterization is required.

The test data can also be used to develop a mean opinion score (MOS) for each of the combinations of subjective quantifications. A mean opinion score provides the average score for all (or most) subjective evaluators. For example, a system can be used where the B (bad), P (poor), F (fair), G (good), and E (excellent) are rated at 0, 1, 2, 3, and 4, respectively. Accordingly, a perfect score would be 4.0 (e.g., all evaluators provide a rating of "E" or four points).

In the preferred embodiment, the BPFGE MOS is used along with the probability that the line is acceptable P(UDI). The combination provides valuable information because, for example, where an MOS of 3.6 is very good and might normally be considered to guarantee user satisfaction, studies have shown that users will nonetheless complain of poor quality when the P(UDI) is greater than six percent regardless of the MOS. Therefore, the overall service predictions are best made when using both MOS and P(UDI).

The probability that a packet-switched voice signal is acceptable is determined by application of a second transform $\tau_2$ and use of an effects matrix 230, as illustrated in FIG. 2. Effects matrix 230 can be produced from an appropriate data in which users have reported for any calls both the presence and severity of selected impairments and effects and/or quality measures for each call as described above.

As can be seen, this aspect of the present invention provides a process that correlates quantifiable parameters with quality characteristics (i.e., impairments) and correlates these quality characteristics with user perception. In this two-step calculation process, objective measurements can be translated into estimates of the P(UDI) and expected opinions score for a particular service.

Continuing with FIG. 2, the input data are a set of objective measurements acquired via repetitious testing of connections to produce a set of measurements that fill in the objective measurements matrix 210. These data are then translated via a first transformation $\tau_1$ into an impairments matrix 220 as discussed above. The entries of matrix 220 constitute the proportion of calls for which the average user population would describe the presence of each of a particular set of impairments identified for those users as being 'none', 'some', or 'much'.

The impairments matrix 220 is then translated via a second transform $\tau_2$ by which an effects model 220 is applied to the impairments matrix to produce estimates of the average P(UDI) and mean opinion score. The effects model provides an estimate for each of the possible none/some/much combinations of the impairments in the impairments matrix of the associated values of P(UDI) and mean opinion score (MOS).

It is contemplated that some savings may be achieved by applying empirical knowledge from satellite or terrestrial communications. For example, the inventor has performed earlier experiments that have developed data that can be used in developing the transforms $\tau_1$ and $\tau_2$ and effects matrix 230. Even through this data was not developed using a packet-switched network, it can still be applied to a packet-switched network.

The inventor has also learned voice signals transmitted via a packet-switched networks can suffer from speech distortion due to packet loss. Earlier work on voice over satellite introduced a need to characterize momentary dropouts, along with noise and crosstalk. In the present invention, this mapping of a None-Some-Much to a P(UDI) is applied to the more current problem. The occurrence of incomplete words projected for a packet-switched call is treated as if it were an objective measurement provided to the model used for voice over satellite. This yields a P(UDI) contributed by the long duration dropouts.

Figure 3A:
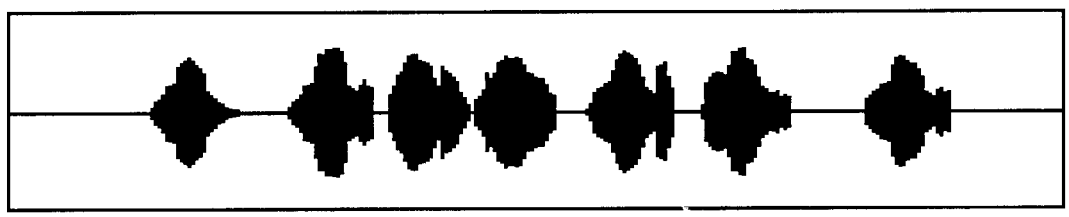
FIGS. 3a–3c are waveforms illustrating the effect of packet loss on a packetized voice signal.
Figure 3B:
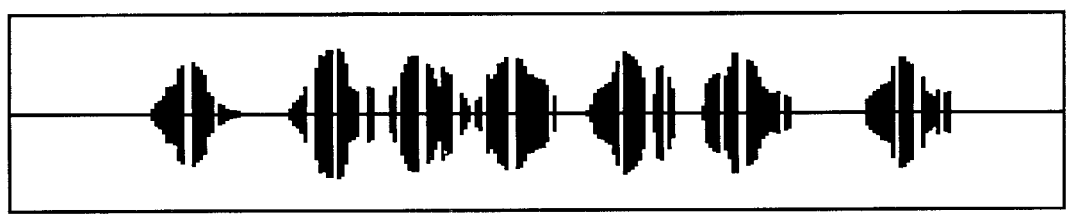
Figure 3C:

Dropout statistics are also used to calculate a probability of short dropouts that cause distorted waveforms, or a so-called "click/warble" effect. This new form of distortion can be correlated with an objective measurement of the rate of loss of packets. FIGS. 3a–3c illustrate an example of the effect of packet loss on a voice signal. FIG. 3a illustrates a voice signal with no appreciable packet loss ("none"). FIG. 3b illustrates the same voice signal with packet loss at the rate of 5 packets/minute while FIG. 3c illustrates the voice signal with packet loss at the rate of 15 packets/minute. The effect of these different levels can be correlated with the subjective perception of speech distortion in a voice signal, to surmise that, absent other gauge of speech distortion, nearly all users will report speech distortion as "none" for the case of FIG. 3b and "much" for the case of FIG. 3c. Further empirical testing will reveal the percentage of "none," "some," and "much" responses for the case of FIG. 3b.

The present invention can be utilized in a variety of contexts. For example, in one embodiment, it is contemplated to repeat the empirical experiments to account for new effects in the packet-switched realm, new spoken languages or coding schemes wherein some impairments may have a greater or lesser effect, or new channel bandwidths.

For example, empirical test results may be different for voice signals spoken in English as opposed to Chinese. As a result, a network in the United States may be optimized differently than one in China. When setting up an international calling plan, the user could specify a language and calls could be routed to optimize the quality for this language. This specification can be for all calls or include different optimizations depending upon the telephone number on the other end.

In one aspect, the present invention solves the problem of how to measure and express the quality of a packet-switched connection and especially, how to predict the callers' responses to a prospective type of connection or component before it is actually released into use. This technique can be used in a variety of applications.

One embodiment is envisioned as a workstation, perhaps even coupled to a network of interest, wherein objective measurements are stored and analyzed according to the process of the present invention. An engineer looking for problems areas within the network, or a sales engineer comparing qualities of various options, may access the workstation to perform projections applicable to some or all of the network.

Another embodiment is envisioned as test equipment that performs measurements or receives data pertaining to a channel under test and then applies the above process to output a P(UDI) and MOS as a figure of merit for the channel under test. The test equipment might also perform a sensitivity analysis to identify which of the objective measurements should be adjusted to best improve the performance of the channel. Without the present invention, an engineer might be inclined to make a decision based upon a noise parameter whereas the more significant a factor might be distortion due to dropouts.

Figure 4:
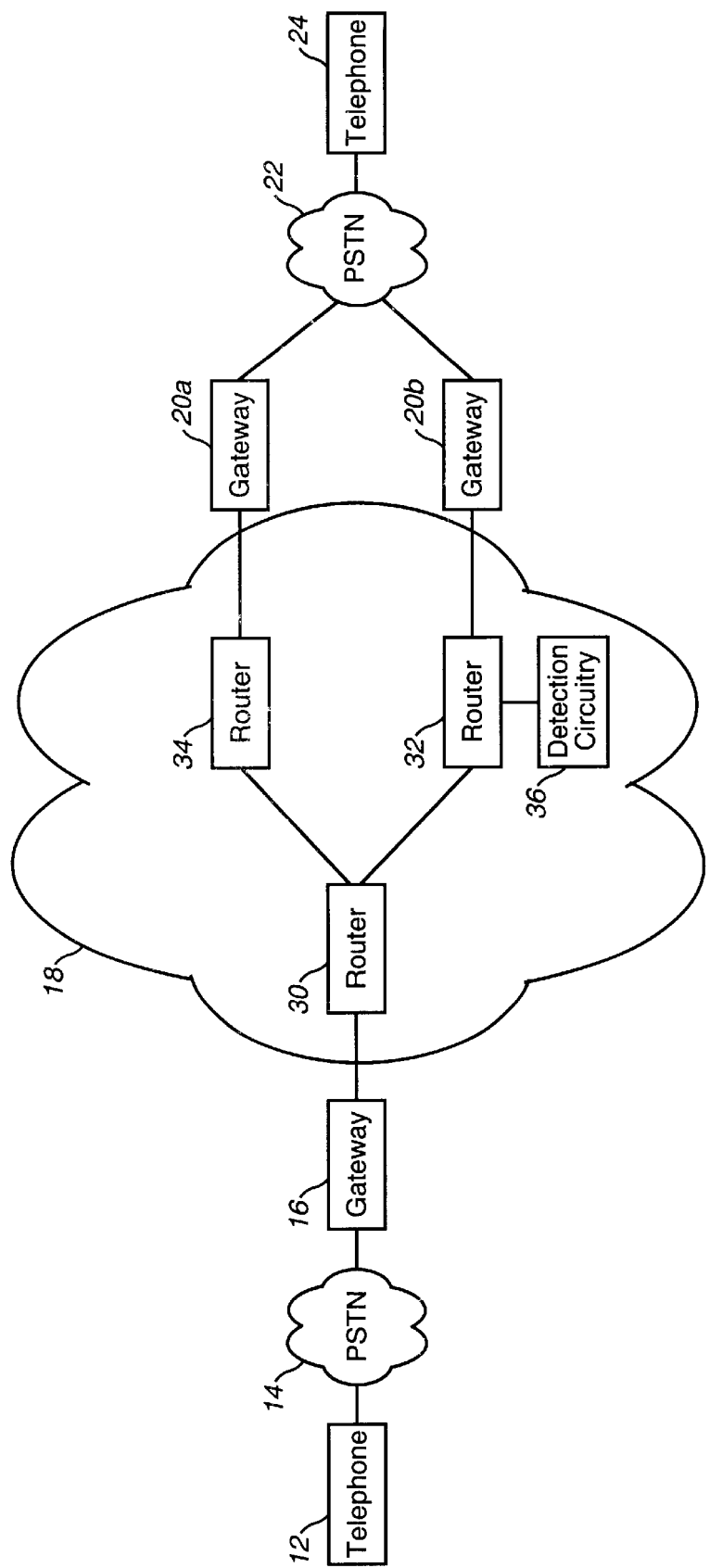
FIG. 4 is a block diagram of communication network that includes a quality control system of the present invention.
Figure 5:
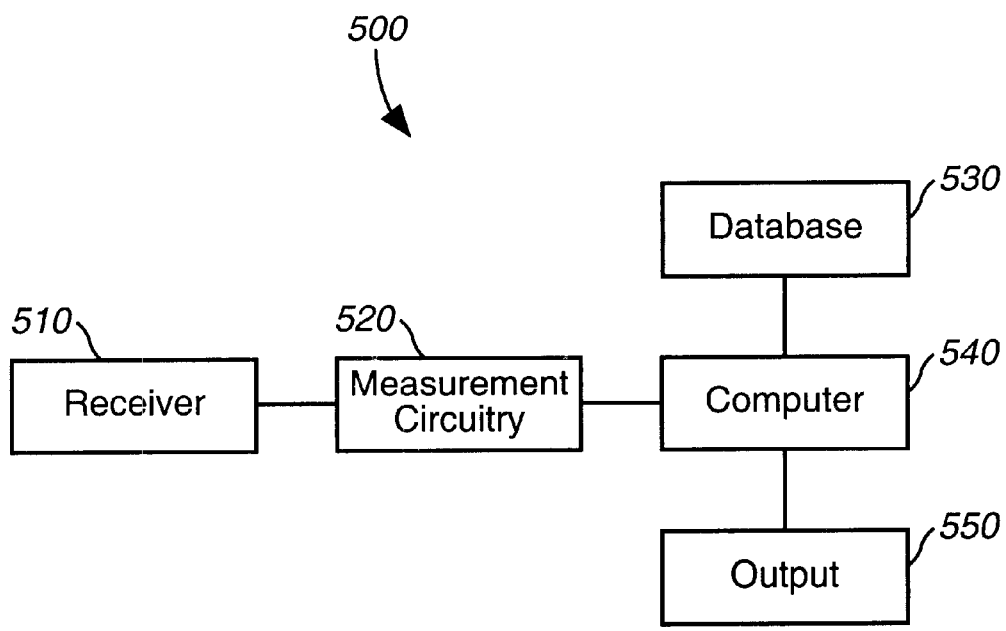
FIG. 5 is a block diagram of an apparatus that can be used to evaluate a communication channel.

As an example, FIG. 5 illustrates a system 500 for evaluating the quality of a packet-switched voice channel. A receiver 510 is coupled to the packet-switched voice channel (not shown). Receiver 510 can, for example, be coupled a router (see routers 30, 32, 34 in FIG. 4), a gateway (see gateways 16, 20 in FIG. 1a), or another portion of the channel. Alternatively, the receiver can be coupled to a specific piece of equipment which in not coupled to a network. In any event, the receiver 510 will receive a voice signal from the packet-switched voice connection.

Measurement circuitry 520 is coupled to the receiver 510. The measurement circuitry 520 measures objective characteristics of the voice signal. Preferably, one of these objective characteristics is the rate of packet loss. As discussed above, each of the objective characteristics is related to a plurality of quality characteristics affecting the quality of the voice signal as perceived by users. Using techniques described above, measurements of the objective characteristics can be translated into subjective quantifications of each of the quality characteristics.

The system 500 also includes a database 530 that stores an effects matrix (see element 230 of FIG. 2). As before, the effects matrix provides quality information for voice signals that include different combinations of subjective quantifications for each quality characteristic. The quality information preferably includes both mean opinion score (MOS) data and a probability that the voice signal is of an acceptable quality level (P(UDI)).

Computer apparatus 540 runs software that calculates the quality information for a given input voice signal. This software utilizes measurements of the objective characteristics, including packet loss and the effects matrix to generate quality information for the voice signal. For example, the software would preferably translate the objective characteristics into a specific combination of subjective quantifications. It would then translate the specific combination via the effects matrix.

Once the quality information is calculated, it will be utilized by output circuitry 550. The output circuitry 550 will depend upon the specific application. In an engineering test set, for example, output circuitry 550 may comprise a visual display or a file (e.g., in system memory or on a disk). Output circuitry 550 could also comprise a port where the data is transported from computer 540.

In commercial network evaluation applications, as another example, output circuitry 550 could comprise a connection to real-time control circuitry (e.g., as could be used in the example of FIG. 4). Alternatively, or in addition, output circuitry could provide a service message to a technician, for example, by pager, e-mail, audio display and/or visual display. Other examples exist. Certainly any of the examples provided with the engineering test set example would also apply in commercial network evaluation applications, and vice versa.

Yet another application of the present invention is with the use of a real-time control system for a telephone network. Such a system is described with reference to FIG. 4, which illustrates a hybrid network similar to the one described with respect to FIG. 1a. The control system would work equally as well with an end-to-end packet-switched telephony system such as the one shown in FIG. 1b.

To begin, it is understood that the block diagram of FIG. 4 (as well as FIGS. 1a and 1b) is a gross over-simplification of what a "real world" network would look like. Much equipment is not illustrated for the sake of simplicity. For example, the routing within the packet-switched network 18 is illustrated by three routers 30, 32 and 34. In any practical system, more routers as well as other components would be used.

As discussed above, a phone call is routed between gateway 16 and gateway 20 (either 20a or 20b) so that users at telephones 12 and 24 may carry on a conversation. In particular, gateway 16 is coupled to a router 30. Router 30 reads the address on the packets and sends them to router 32 (via any of a number of pathways which may vary between packets). Router 32 is coupled to gateway 20b which provides the signal to the circuit switched telephone network 22 and then to telephone 24.

Detection circuitry 36 is coupled to router 32 and is used to measure objective characteristics of the packet-switched signal at router 32. For example, detection circuitry 36 may be software running on a computer (e.g., the same computer which serves as router 32) to measure the number of packets lost at the router. Based on the packet loss, and possibly other objective characteristics, the detection circuit calculates the P(UDI) of the signal. If the P(UDI) goes above a certain threshold, the detection circuit will cause a message to be sent to router 30 that will cause the signals to be rerouted away from the troublesome portion of the network. In the illustrated example, router 30 will re-route the voice traffic to router 34, which is coupled to gateway 20a.

Detection circuitry 30 can be incorporated in many different portions of the network. In this manner, the source of errors can be detected. With this information, calls can be re-routed and service personnel can be notified. For example, an automatic message, e.g., visual indication, pager, e-mail, can be initiated when an error is found. Using a system, such as the one described here, would lower the number of dissatisfied customers by predicting and correcting low quality voice connections.

As yet another example, the present invention can used to aid in the design of network components. Since the invention provides a mathematical model, an engineer can predict what would happen if the characteristics of one of the components were to change. For example, an engineer may wish to lower the performance requirements of an echo canceler, to lower cost. Before building new equipment, the effect of such a redesign could be predicted and any desirable design modifications made before finalizing the design.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of evaluating the quality of a packet-switched voice signal, the method comprising:
    selecting a plurality of objective characteristics for a voice connection being transmitted across a packet-switched network, at least one of the objective characteristics comprising packet loss;
    selecting a plurality of quality characteristics of a voice signal, each of the quality characteristics affecting the quality of the voice signal as perceived and described by users;
    generating a plurality of evaluation voice messages by varying selected ones of the plurality of objective characteristics for each of the evaluation voice messages;
    developing a transform that can be used to translate measurements of each of the objective characteristics into subjective quantifications of each of the plurality of quality characteristics;
    empirically acquiring user perception data by having at least one test subject listen to the evaluation voice messages and rate the quality of each evaluation voice message as one of a plurality of subjective quality ratings and also having the at least one test subject provide an overall quality opinion score of each of the evaluation voice messages;
    developing an effects model based on the empirically acquired user perception data, the its effects model providing perceived quality as a function of the subjective quantifications of the quality characteristics; and
    determining a probability that the packet-switched voice signal will fall within a selected one of the subjective quality ratings by measuring each of the objective characteristics and then translating measurements of the objective characteristics into subjective quantifications of each of the plurality of quality characteristics, the subjective quantifications being used with the effects model to determine the probability that the packet-switched voice signal will fall within a selected one of the subjective quality ratings.

2. The method of claim 1 wherein in at least one of the objective characteristics is selected from the group consisting of signal loss, signal level, noise, echo path delay, and echo path loss.

3. The method of claim 1 wherein developing a transform comprises developing a transform that can be used to translate measurements of each of the objective characteristics into one of three subjective quantifications of each of the plurality of quality characteristics.

4. The method of claim 1 wherein the effects model includes data relating to the perceived quality of each of a plurality of voice signals, the voice signals having varying subjective quantifications of the each of the plurality of quality characteristics.

5. The method of claim 1 wherein the method is used to evaluate a portion of a communications network.

6. The method of claim 5 further comprising transmitting a voice signal across the portion of the communications network before the portion is placed into service.

7. The method of claim 1 further comprising measuring objective characteristics of packet-switched voice signals being transmitted across a commercial network in real time.

8. The method of claim 7 further comprising predicting the quality of the packet-switched voice signals being transmitted across the commercial network in real time.

9. The method of claim 8 further comprising providing a quality control message if the quality predicted falls below a quality threshold level.

10. The method of claim 9 further comprising rerouting the packet-switched voice signals in response to the quality control message.

11. A method of controlling communications across a packet-switched network, the method comprising:
    receiving a voice message at a first portion of the network, the voice message being in packet form;
    routing the voice message from the first portion of the network to a second portion of the network;
    evaluating the voice message at the second portion of the network to determine packet loss and at least one other objective characteristic, the rate of packet loss and the at least one other objective characteristic being related to a plurality of quality characteristics affecting the quality of the voice signal as perceived by users such that measurements of the rate of packet loss and the at least one other objective characteristic can be translated into subjective quantifications of each of the quality characteristics;
    predicting a quality level of the voice message at the second portion of the network, the prediction being based, at least in part, on determined levels of packet loss and the at least one other objective characteristic, the prediction also being based on data from an effects matrix that provides quality information for voice signals that include different combinations of subjective quantifications for each quality characteristic; and
    if the quality level falls below a threshold quality level, generating a message indicating a low quality voice message.

12. The method of claim 11 further comprising causing the first portion of the network to re-route voice communications in response to the message.

13. The method of claim 11 wherein a service notice is generated in response to the message.

14. The method of claim 11 wherein the quality level includes both a mean opinion score and a probability that the voice signal will be acceptable.

15. The method of claim 11 wherein the communications network comprises a hybrid communications network that includes a packet-switched network portion and a circuit switched network portion.

16. An apparatus for evaluating the quality of a packet-switched voice connection, the apparatus comprising:

a receiver coupled to the packet-switched voice connection to receive at least one voice signal from the packet-switched voice connection;

measurement circuitry coupled to the receiver, the measurement circuitry measuring rate of packet loss and at least one other objective characteristic of the voice signal, the rate of packet loss and the at least one other objective characteristic being related to a plurality of quality characteristics affecting the quality of the voice signal as perceived by users such that measurements of the rate of packet loss and the at least one other objective characteristic can be translated into subjective quantifications of each of the quality characteristics;

a database for storing an effects matrix, the effects matrix providing quality information for the voice signal that includes different combinations of subjective quantifications for each quality characteristic; and software operating on the apparatus, the software including computer instructions utilizing measurements of the rate of packet loss and the at least one other objective characteristic and the effects matrix to generate quality information for the voice signal.

17. The apparatus of claim 16 wherein the software includes computer instructions for:

translating the objective characteristics into a specific combination of subjective quantifications; and looking up the specific combination in the effects matrix.

18. The apparatus of claim 16 wherein the quality information provided by the effects matrix includes both a mean opinion score and a probability that the call will be acceptable.

19. The apparatus of claim 16 wherein in the at least one objective characteristics is selected from the group consisting of signal level, noise, echo path delay, and echo path loss.

20. The apparatus of claim 16 wherein the apparatus is coupled to a commercial packet-switched voice network and receives voice signals being generated by a commercial subscriber in real time.

21. A method of evaluating the quality of a packet-switched voice signal, the method comprising:

selecting a plurality of objective characteristics for a voice signal being transmitted across a packet-switched network, at least one of the objective characteristics comprising packet loss;

generating a plurality of voice test signals, the test signals having varying quantities of packet loss;

experimentally determining at least one threshold level to categorize quantitative measurements of packet loss into a plurality of categories, the categories being determined by having at least one evaluator rate the amount of speech distortion for each of the plurality of voice test signals;

providing threshold levels for each of the other objective characteristics to categorize quantitative measurements of the respective objective characteristic into a plurality of categories;

generating a plurality of evaluation voice messages by varying selected ones of the plurality of objective characteristics for each of the evaluation voice messages;

empirically measuring perceived quality of each of the evaluation voice messages by having at least one test subject listen to the evaluation voice messages and rate the quality of each voice message as one of a plurality of subjective quality ratings; and determining a probability that the packet-switched voice signal will fall within a selected one of the subjective quality ratings by correlating a quantitative measurement of the objective criterion of the packet-switched voice signal with said subjective quality rating to predict the subjective quality rating of the packet-switched voice signal.

22. The method of claim 21 wherein in at least one of the objective characteristics is selected from the group consisting of signal level, signal loss, noise, echo path delay and echo path loss.

23. The method of claim 21 wherein the method is used to evaluate a portion of a communications network.

24. The method of claim 23 further comprising transmitting the voice signal across the portion of the communications network before the portion is placed into service.

25. The method of claim 21 further comprising measuring objective characteristics of the packet-switched voice signals being transmitted across a commercial network in real time.

26. The method of claim 25 further comprising predicting the quality of the packet-switched voice signals being transmitted across the commercial network in real time.

27. The method of claim 25 further comprising providing a quality control message if the quality predicted falls below a quality threshold level.

28. The method of claim 27 further comprising rerouting the packet-switched voice signals in response to the quality control message.

* * * * *